(12) United States Patent
Kislal

(10) Patent No.: US 9,135,693 B2
(45) Date of Patent: Sep. 15, 2015

(54) IMAGE CALIBRATION AND ANALYSIS

(75) Inventor: Ellen Eide Kislal, Tarrytown, NY (US)

(73) Assignee: SKIN OF MINE DOT COM, LLC, Valhalla, NY (US)

(*) Notice: Subject to any disclaimer, the term of this patent is extended or adjusted under 35 U.S.C. 154(b) by 386 days.

(21) Appl. No.: 13/109,689

(22) Filed: May 17, 2011

(65) Prior Publication Data

US 2011/0286644 A1 Nov. 24, 2011

Related U.S. Application Data

(60) Provisional application No. 61/345,886, filed on May 18, 2010, provisional application No. 61/355,628, filed on Jun. 17, 2010, provisional application No. 61/368,701, filed on Jul. 29, 2010, provisional application No. 61/369,407, filed on Jul. 30, 2010, provisional application No. 61/413,298, filed on Nov. 12, 2010, provisional application No. 61/413,321, filed on Nov. 12, 2010.

(51) Int. Cl.
G06K 9/00 (2006.01)
G06T 7/00 (2006.01)

(52) U.S. Cl.
CPC ..... *G06T 7/0012* (2013.01); *G06T 2207/10024* (2013.01); *G06T 2207/30088* (2013.01)

(58) Field of Classification Search
CPC .......... G06T 7/0012; G06T 2207/10024; G06T 2207/30088; A61B 5/0059; A61B 5/0088; A61B 5/0531; A61B 5/0534; A61B 5/0537; A61B 5/1032; A61B 5/442; A61B 5/4869; A61B 5/4875

USPC ......... 382/164, 165, 167, 170, 118, 128, 115; 435/4, 7.1, 11; 600/306, 473
See application file for complete search history.

(56) References Cited

U.S. PATENT DOCUMENTS

| 5,862,272 | A  | * | 1/1999  | Ishiguro et al. ............... 382/312 |
| 5,912,114 | A  | * | 6/1999  | Hutchinson et al. ............. 435/4 |
| 6,081,612 | A  | * | 6/2000  | Gutkowicz-Krusin et al. ............ 382/128 |
| 7,233,693 | B2 | * | 6/2007  | Momma ....................... 382/162 |
| 7,564,990 | B2 |   | 7/2009  | Kern et al. |
| 7,939,514 | B2 | * | 5/2011  | Arellano Mendoza ....... 514/171 |
| 8,064,677 | B2 |   | 11/2011 | Nie et al. |
| 2002/0181752 | A1 | * | 12/2002 | Wallo et al. .................. 382/130 |
| 2005/0226821 | A1 | * | 10/2005 | Waugh et al. ................... 424/50 |
| 2007/0040907 | A1 |   | 2/2007  | Kern et al. |
| 2007/0053559 | A1 |   | 3/2007  | Corrion |
| 2007/0073156 | A1 | * | 3/2007  | Zilberman et al. ............ 600/473 |
| 2007/0191741 | A1 |   | 8/2007  | Tsai et al. |
| 2009/0245603 | A1 | * | 10/2009 | Koruga et al. ................ 382/128 |

(Continued)

OTHER PUBLICATIONS

Marc Clifton, A Simple Drag and Drop How to Examplem Dec. 10, 2004, pp. 7.*

(Continued)

*Primary Examiner* — Mekonen Bekele
(74) *Attorney, Agent, or Firm* — Ference & Associates LLC

(57) ABSTRACT

Systems, methods, apparatuses and computer program products for image calibration and analysis are described. One aspect provides quantitatively analyzing a representation of a dermatological condition of an image; and providing one or more outputs responsive to said quantitatively analyzing said representation of said dermatological condition of said image. Other embodiments are described.

12 Claims, 10 Drawing Sheets

(56) References Cited

U.S. PATENT DOCUMENTS

| | | | |
|---|---|---|---|
| 2009/0316168 A1* | 12/2009 | Enjuji | 358/1.9 |
| 2010/0166331 A1* | 7/2010 | Chan et al. | 382/254 |
| 2010/0271470 A1* | 10/2010 | Stephan et al. | 348/77 |
| 2011/0002511 A1 | 1/2011 | Imaoka | |
| 2011/0038920 A1* | 2/2011 | Mori et al. | 424/445 |
| 2011/0262014 A1* | 10/2011 | Kuo | 382/128 |
| 2011/0301441 A1* | 12/2011 | Bandic et al. | 600/306 |
| 2012/0321160 A1* | 12/2012 | Carroll | 382/131 |

OTHER PUBLICATIONS

Yahoo! Design Pattern Library, Drag and Drop—YUI Library, http://yuilibrary.com/yui/docs/dd/, pp. 8, published, published Sep. 2011.*

Carrara, et al., "Automated Segmentation of Pigmented Skin Lesions in Multispectral Imaging", Physics in Medicine and Biology, Nov. 2, 2005, 13 pages, IOP Publishing Ltd, UK.

* cited by examiner

IMAGE CALIBRATION AND ANALYSIS

CLAIM FOR PRIORITY

This application claims priority to: U.S. Provisional Patent Application Ser. No. 61/345,886, filed on May 18, 2010; U.S. Provisional Patent Application Ser. No. 61/355,628, filed on Jun. 17, 2010; U.S. Provisional Patent Application Ser. No. 61/368,701, filed on Jul. 29, 2010; U.S. Provisional Patent Application Ser. No. 61/369,407, filed on Jul. 30, 2010; U.S. Provisional Patent Application Ser. No. 61/413,298, filed on Nov. 12, 2010; and U.S. Provisional Patent Application Ser. No. 61/413,321, filed on Nov. 12, 2010, all of which are incorporated by reference as if fully set forth herein.

BACKGROUND

Various conditions that manifest visually, such as dermatological conditions, are of interest for a variety of reasons. In managing such conditions, establishing a level or degree of a particular condition (scoring) may be desirable, such as for establishing a degree of the condition for comparison purposes, et cetera. Similarly, when determining the effectiveness of a treatment, process or product, it may be desirable to have a reliable mechanism for establishing a condition's current state, and monitoring any changes in the condition over time, such as might result from a course of treatment. Moreover, predicting likely changes, such as resultant from a course of treatment, may also be desirable prior to undertaking any particular actions regarding the condition.

BRIEF SUMMARY

In summary, one aspect provides a method comprising: receiving an image including a representation of a dermatological condition at a computing device; quantitatively analyzing the representation of said dermatological condition of said image; said quantitatively analyzing comprising one or more of: clustering pixels of said image; determining a dimension of said dermatological condition; and determining a portion of said image to be altered; and providing one or more outputs responsive to said quantitatively analyzing said representation of said dermatological condition of said image; said one or more outputs comprising one or more of: a reported score of said dermatological condition, one or more comparison images representing a dermatological condition, and an alteration of said image representing said dermatological condition.

Another aspect provides a computer program product comprising: a computer readable storage medium having computer readable program code embodied therewith, the computer readable program code comprising: computer readable program code configured to receive an image including a representation of a dermatological condition; computer readable program code configured to quantitatively analyze the representation of said dermatological condition of said image; wherein to quantitatively analyze comprises one or more of: clustering pixels of said image; determining a dimension of said dermatological condition; and determining a portion of said image to be altered; and computer readable program code configured to provide one or more outputs responsive to quantitatively analyzing said representation of said dermatological condition of said image; said one or more outputs comprising one or more of: a reported score of said dermatological condition, one or more comparison images representing a dermatological condition, and an alteration of said image representing said dermatological condition.

A further aspect provides a system comprising: one or more processors; and a memory operatively coupled to the one or more processors; wherein, responsive to execution of a program of instructions, the one or more processors are configured to: quantitatively analyze the representation of said dermatological condition of said image; wherein to quantitatively analyze comprises one or more of: clustering pixels of said image; determining a dimension of said dermatological condition; and determining a portion of said image to be altered; and provide one or more outputs responsive to said quantitatively analyzing said representation of said dermatological condition of said image; said one or more outputs comprising one or more of: a reported score of said dermatological condition, one or more comparison images representing a dermatological condition, and an alteration of said image representing said dermatological condition.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
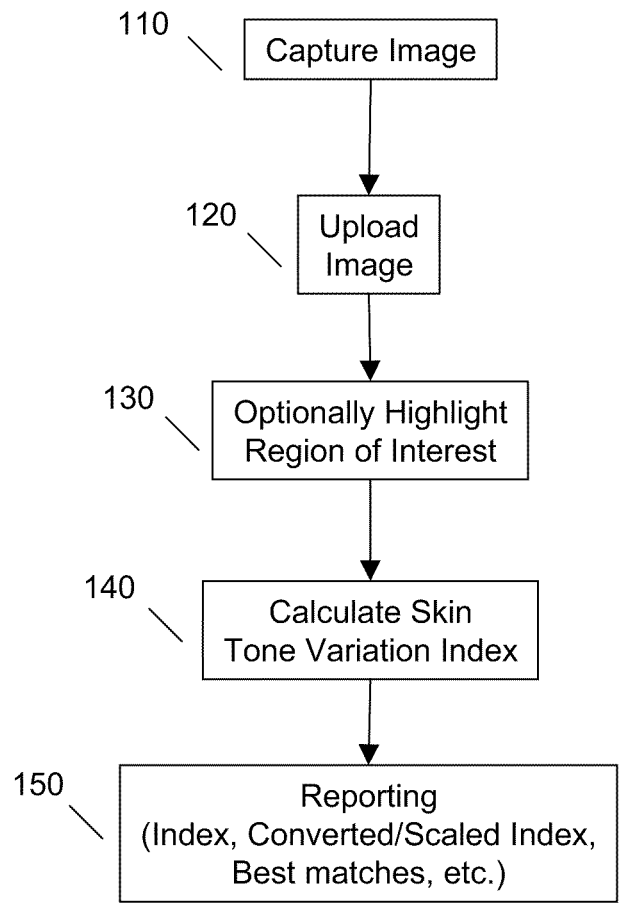
FIG. 1 illustrates an example method for analyzing skin coloration.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the claims, but is merely representative of those embodiments.

Reference throughout this specification to "embodiment(s)" (or the like) means that a particular feature, structure, or characteristic described in connection with the embodiment is included in at least one embodiment. Thus, appearances of the phrases "according to embodiments" or "an embodiment" (or the like) in various places throughout this specification are not necessarily all referring to the same embodiment.

Furthermore, the described features, structures, or characteristics may be combined in any suitable manner in different embodiments. In the following description, numerous specific details are provided to give a thorough understanding of example embodiments. One skilled in the relevant art will recognize, however, that aspects can be practiced without certain specific details, or with other methods, components, materials, et cetera. In other instances, well-known structures, materials, or operations are not shown or described in detail to avoid obfuscation.

Embodiments are described herein with reference to image analysis as conducted using one or more computing devices. It should be noted that embodiments described throughout this description might be implemented as a stand-alone program on a stand-alone device, or in a distributed system (for example, as a web-based application). Moreover, embodiments described in the example context of analysis of dermatological conditions also may be employed in a variety of contexts, for example analysis of visual variations represented in images of products, such as ceramics, fabrics and glass.

Although certain measurement and/or scoring systems have been established, such as for vitiligo, psoriasis, et cetera, these share some shortcomings. For example, these measurement and/or scoring systems are complicated and time-consuming, which makes them impractical in most clinical settings. Also, these measurement and/or scoring systems often involve a mixture of quantification and approximation, introducing an element of subjectivity.

Accordingly, an embodiment may use an ordinary digital image, such as a digital photograph captured in a clinical setting or at home, of a dermatological condition to provide quantitative analyses of a representation of the dermatological condition (captured in the image). Calibrated measurements may be used in providing the quantitative measurements. Calibrated measurements may include for example calibrated coloration information of pixels of the image and/or calibrated sizing information (regarding the size of affected areas, the appearance/size of a body part, and the like). The calibrated measurements may be derived from the image itself, for example via use of a calibration device within the image, through user provided input, or a suitable combination of the foregoing. An embodiment provides output responsive to quantitatively analyzing the representation of the dermatological condition. The output may include for example a reported score, comparison image(s), alteration(s) of the original image representing the dermatological condition, or a suitable combination of the foregoing.

Some information on systems and methods for monitoring the condition of skin is found in co-pending and commonly assigned U.S. patent application Ser. No. 12/833,064, filed on Jul. 9, 2010, and which is incorporated by reference as if fully set forth herein. Embodiments provide for a semi-automated assessment of dermatological condition(s) from digital image(s). As used herein, the dermatological conditions may include medical or health related conditions, for example psoriasis, vitiligo, et cetera, or cosmetic conditions, for example the plumpness of lips, wrinkles, varicose veins, et cetera. Thus, dermatological conditions may include the pigmentation or coloration of skin (such as for example in vitiligo, melasma, psoriasis, acne and the like), other appearance metrics (such as for example with respect to scaliness, redness and/or whiteness of skin, as commonly appears in psoriasis), the appearance or size of a body part or area (such as for example the plumpness of the lips), or a suitable combination of the foregoing. Specific, non-limiting examples of dermatological conditions thus include but are not necessarily limited to vitiligo, melasma, psoriasis, acne, coloration of skin generally (such as de-pigmentation, redness, and the like), varicose veins, and lip plumpness.

An embodiment provides for semi-automated assessment of various dermatological conditions from digital image(s). An embodiment allows users to simulate changes to dermatological conditions, for example likely outcomes from various proposed treatments, such as for a dermatological condition or concern, using digital image(s) and alterations thereof.

The description now turns to the figures. The illustrated example embodiments will be best understood by reference to the figures. The following description is intended only by way of example and simply illustrates certain example embodiments representative of the invention, as claimed.

Referring to FIG. 1, an example method for measuring and reporting discoloration in skin using images may include the following. A user takes a photograph of the skin with a digital camera or mobile device 110. The user uploads the image 120 (for example over a network connection to a remote web server). Optionally, the user highlights a subset of the image (pixels) to be considered in the analysis 130. An embodiment then calculates the number of different grayscale values appearing in the image (or region thereof, if specified) 140. This number (or variant thereof) may be used as a "skin tone variation index". An embodiment then reports one or more results to the user 150. The results may be reported in a variety of ways. For example, an embodiment may compare the skin tone variation index calculated to a database of images, each of which is tagged with a skin tone variation index. The image that is tagged with a closest skin tone variation index to the uploaded image's index is chosen as a "peer". The peer image then may be displayed to the user along with the skin variation index.

The input of an image of skin is all that is required of a user (the specification by the user of a region of interest is optional). The calculation and reporting of the skin tone variation index is processed automatically, making the measurement and reporting user friendly. The manner in which the skin tone variation index (or any like metric) is computed, reported and/or compared may be varied depending on the context and/or output desired. For example, the skin tone variation index may be converted to a simple, scaled and/or normalized integer and reported without comparing. Moreover, sets of similar and/or dissimilar images may be selected as peers and reported for various comparison scenarios.

An embodiment allows the user to highlight a particular region of interest in the image 130, for example by using a computer mouse (or other input device) to select the region of interest in the image. For example, using a mouse, while pressing a key on a keyboard, a user may highlight a region of interest in the image (as for example displayed in a web browser). Releasing the key pauses the region of interest so that the mouse may be moved to a different part of the image before continuing to mark the region of interest. Once the region of interest is specified, the pixels associated with it are passed to an application, which calculates a skin tone variation index 140.

For example, the application may count the number of unique grayscale values (between 0 and 255, inclusive) that appear in the image. These fall into the specified region of interest (if selected), and the application reports the number of unique grayscale values in the region of interest as the skin tone variation index. If no region of interest is specified, the region of interest may be determined automatically, or the whole image may be considered. This number of pixels may be optionally mapped to another range, for example 0 to 100, before being reported.

Once the skin tone variation index is calculated 140, it may be compared to images in a pre-assembled database of images, each of which is assigned (or can be assigned) an index measured similarly to the above-described example process, prior to being reported 150. The image(s) whose index is closest to the current image may be chosen as the best skin tone variation match and displayed, along with the skin tone variation index, to the user. Thus, an embodiment allows one to utilize this capability from his or her home via accessing a website through a web browser.

Figure 2:
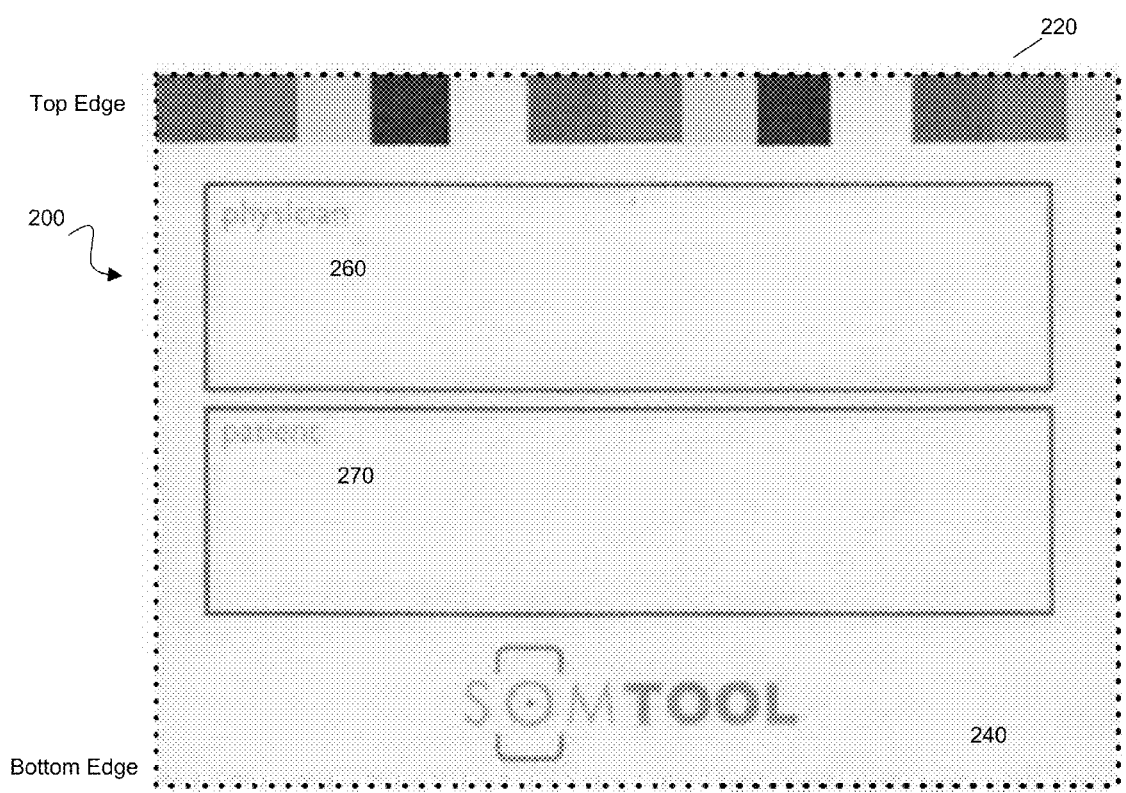
FIG. 2 illustrates an example calibration device.

Referring to FIG. 2, in order to facilitate normalization among images used for comparisons, and to allow for quantification of measurements (size, color, orientation, and the like), each image may include a calibration device 200, which may include a calibration device such as described in co-pending and commonly assigned U.S. patent application Ser. No. 13/042,976, entitled "SYSTEMS AND METHODS FOR BIO-IMAGE CALIBRATION", filed on Mar. 8, 2011 and incorporated by reference here. Inclusion of a calibration device 200 within an image enables an embodiment to perform color, orientation and size analyses, as well as perform automated comparisons with peer image(s).

FIG. 2 illustrates an example calibration device 200. In this example, the color blocks 220 (for example, blocks of cyan, magenta, yellow, black and white) are located along a top edge of the calibration device 200. The color blocks are positioned for example below or beside the feature or condition of interest, such as a dermatological condition, to be captured in an image. Calibration device 200 may further include identification areas 260, 270 for identifying physician and patient, respectively. For example, a user may write in the names of the physician and patient in areas 260, 270 prior to image capture. The calibration device 200 likewise contains a top edge and bottom edge, with indications of orientation, such as handle 240 that can be positioned consistently (for example, towards the ground) for consistent orientation determination. Moreover, calibration device 200 includes watermark generating capability, and dimension and color calibration capabilities, by virtue of a predetermined pattern and size of color blocks 220.

Figure 3:
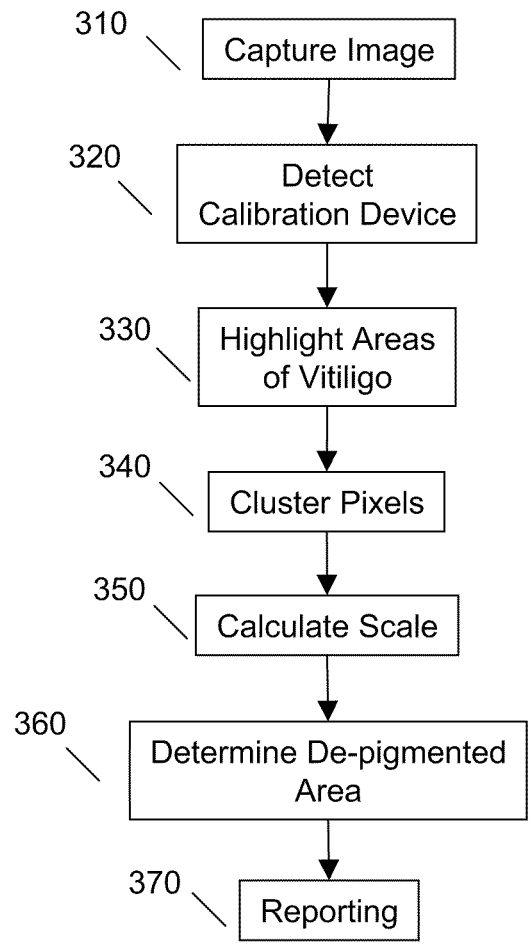
FIG. 3 illustrates an example method for analyzing vitiligo.

Referring to FIG. 3, an embodiment allows for analysis of pigmentation of skin, for example in vitiligo patients. An example method for tracking re-pigmentation includes obtaining a calibration device 200 and capturing an image of skin with vitiligo, with the calibration device 200 contained in the image 310. After uploading the image to the system, a user may select the calibration device 200 appearing within the image 320. The user may also (crudely) highlight de-pigmented areas of interest appearing within the image 330, such as by utilizing a mouse to select areas of interest. An embodiment then clusters the pixels of the image within the area of interest into two categories: de-pigmented and pigmented 340. Clustering may be done using a standard method, such as k-means, and labeling the class with the lightest intensity as de-pigmented skin, and the other class as normally pigmented skin.

An embodiment detects the calibration device 200 in the image (either automatically or via user selection) 320, and uses the calibration device 200 to calculate a scale 350. For example, an embodiment scans the area of the calibration device 200 of known dimensions (such as the top edge having color blocks 220) to determine the dominant spatial frequency. This frequency may be used to determine the scale of the image, since each area of the calibration device 200 is of know dimensions (for example, 5 mm square color blocks 220 included in the calibration device 200). The number of square millimeters per pixel may then be determined, and the number of de-pigmented pixels may be multiplied by the scale (square millimeters/pixel in this example) to calculate the area of de-pigmentation in square mm.

An embodiment allows a user to "paint" over (or highlight in some fashion) de-pigmented regions in the image by moving the computer mouse over them, including some pigmented and some de-pigmented skin. The software performs a clustering of the pixels contained within the highlighted region of the image into two sets, one representing pigmented and one represented de-pigmented regions. An embodiment then calculates the number of pixels in the de-pigmented region. The calibration device 200 in the image may be used to determine the number of square millimeters per pixel. The area of de-pigmentation then may be calculated as the number of de-pigmented pixels multiplied by the number of square millimeters per pixel, which may be reported to a user 370. An embodiment may thus be utilized to initially determine the severity of vitiligo, as indicated by the area of de-pigmentation, and further to monitor any changes in such conditions by comparing images captured before and after treatment(s).

Figure 4:
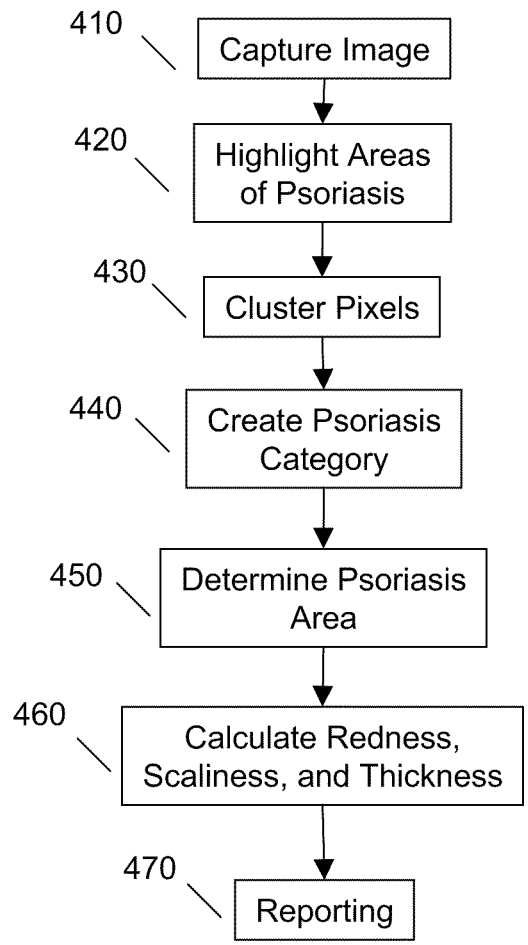
FIG. 4 illustrates an example method for analyzing psoriasis.

Referring to FIG. 4, an embodiment provides a method for quantifying and monitoring a dermatological condition captured by an image, such as psoriasis. For example, a user captures an image of the skin 410. The image contains patches of psoriasis as well as a calibration device 200, as described herein, including some red or magenta blocks and some white blocks (220). The user may highlight an area of concern (for example, using the computer mouse) covering psoriasis patches and including some background skin 420. An embodiment then clusters the pixels of the image into three categories: background skin, scales, whiteness, and redness 430. The clustering may be a k-means style clustering. The cluster corresponding to the set of pixels with the highest degree of redness and whiteness get labeled psoriasis, while the remaining cluster gets labeled background skin. The whiteness and redness categories are then combined to form a psoriasis category 440.

Scaling may be performed, as described herein, to identify a psoriasis area 450. To determine scale, as in the case of vitiligo, the user may drag a line through the colored blocks 220 of the calibration device 200 in the image. An embodiment then is able to determine the dominant spatial frequency along the line, and from that, derive a multiplier to convert pixels to square millimeters. For example, the number of pixels in the psoriasis category may be multiplied by the number of square mm/pixel determined from the calibration device 200 within the image to get an overall area of coverage. In order to convert square millimeters to a percentage of body covered, an embodiment may use the Mosteller formula based upon input from the user about patient height and weight to approximate the body surface area. The ratio of the area of psoriasis to the total surface area gives the percentage covered.

Once an embodiment has estimated the boundaries of the psoriasis, it may perform additional analyses within the psoriatic region, such as redness. In order to quantify redness, an embodiment may consider the difference between red and green channels within the psoriatic region and within the entire image. An embodiment may report peak redness as the ratio of the peak difference within the psoriasis region to the peak difference in the entire image. Other dimensions, such as scaliness and thickness, may also be estimated within the psoriatic region, as described further herein.

The redness and thickness indicated by pixels in the image may be calculated, as may be the scaliness of the psoriasis 460. For example, the reddest pixel in the psoriasis category may be compared to the reddest pixel in the calibration device 200. The ratio of the reddest pixel in the psoriasis category and the reddest pixel in the calibration device 200 may be used to generate a redness score for reporting 470. Similarly, the whitest pixel in the psoriasis category may be compared to the whitest pixel in the calibration device 200, with the ratio generating a thickness score for reporting 470. The number of edges in the psoriasis region may be used to determine a "scaliness" score for reporting 470 (reflective of the scaling of the skin caused by psoriasis). Thus, an embodiment allows an individual to monitor psoriasis, such as between doctor visits.

An embodiment may also treat redness generally as another condition. A redness calculation may be performed similarly to a calculation for psoriasis as described herein. For example, an embodiment may take the ratio of the maximum red value within the highlighted area of interest with the maximum red value in the calibration device ("maximum redness") to determine a maximum redness score for the highlighted area of interest (or some sub-portion thereof). Similarly, an embodiment may take the ratio of the average redness within the highlighted area of interest to the maximum redness in the calibration device 200 ("average redness"). These may be reported in a variety of ways, such as scaled scores, et cetera.

Figure 5:
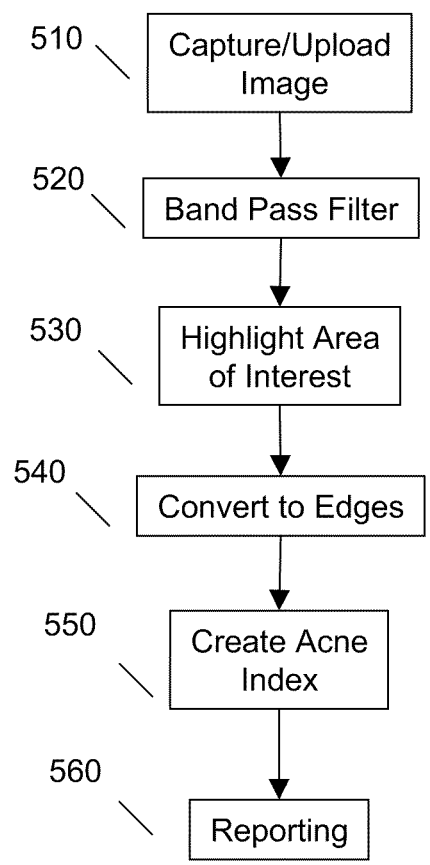
FIG. 5 illustrates an example method for analyzing acne.

Referring to FIG. 5, an embodiment provides for analyzing acne as captured in an image. For computation of an acne index, following the capture and upload of an image, 510, an embodiment may apply a spatial band pass filter to the uploaded image to suppress features with spatial frequencies which are too high or too low to likely represent acne lesions. A user may mark a region of interest (for example, using the computer mouse) 530. An embodiment then converts the image to a representation of edges by taking spatial derivative 540. An embodiment then examines the red channel of the RGB representation of the edges, and sums all edges within the region of interest whose red intensity is greater than a threshold value, with the sum providing an "acne index" 550, which may be reported in a variety of ways 560, as described herein.

An embodiment provides for analysis of varicose veins (and spider veins, a common, mild variation of varicose veins) as a dermatological condition. For example, an embodiment may perform characterization of the edges (representing varicose veins) in the image. The analysis can include for example automated finding of edges in the image by calculating the gradient of the image and searching for local maxima in the magnitude of the gradient. The intensity of all edges falling in a given area (for example, user selected or marked area) whose strength is greater than a threshold are summed to give a "varicose vein index", which is for example a scaled score corresponding to a value representing the strength of the edges in the marked area. The analysis can further include, for example, comparisons with one or more reference images of varicose veins. The reference image can include for example an earlier photograph/image of the same area aligned with the current image, and/or stock images. As with the examples described in connection with other conditions, embodiments allow for storing the images and the corresponding analyses in a database. Embodiments provide the images and/or the analyses as output to one or more users.

As a non-limiting example, an individual can complete a varicose vein analysis before and after undergoing a varicose vein treatment in order to test the efficacy of the treatment. If the varicose vein treatment was effective, the varicose vein index should decrease and/or the best match reference image(s) should appear with fewer varicose veins than the previous best match.

Regarding edge detection, this is a fundamental tool in computer vision and image processing. Various algorithms have been devised for detecting edges in photographs; most of them can be categorized as either search-based or zero-crossing based. The search-based methods detect edges by first computing a measure of edge strength, such as the gradient magnitude, and then searching for local maxima of the gradient magnitude. The zero-crossing based methods look for zero crossings in a second-order derivative computed from the image. Varicose vein analysis may be performed by embodiments using any suitable edge detection method.

Figure 6:
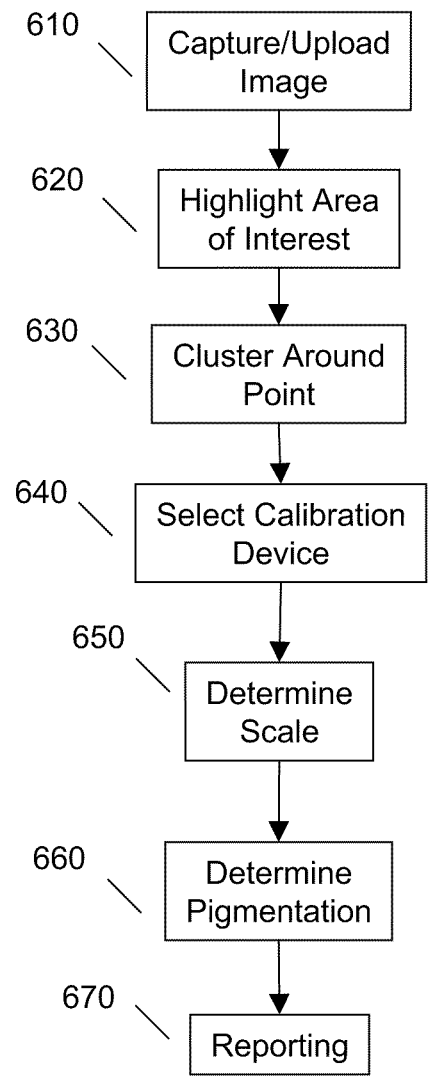
FIG. 6 illustrates an example method for analyzing melasma.
Figure 7:
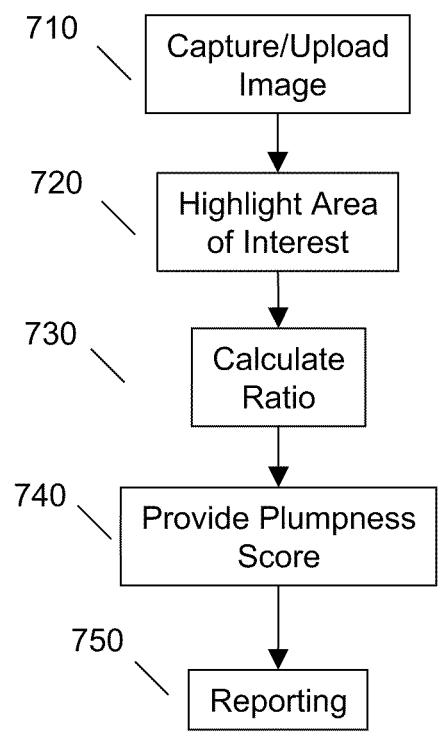
FIG. 7 illustrates an example method for analyzing dimensions of a dermatological condition.

Referring to FIG. 6, an embodiment provides for analyzing discoloration due to a condition such as melasma. After capture and uploading of an image, 610, a user may mark a region of interest (for example, using the computer mouse) 620. An embodiment then clusters all pixels of the image within a radius (R) of a given point in the region of interest into two groups: dark and light 630. The point (pixel) in question is labeled as either "dark" or "light" depending on the cluster it falls into. A user may then select (for example, click on) a calibration device 200 in the image 640. An embodiment calculates the scale 650, for example by determining spatial frequencies with maximum energy and multiplying the number of dark pixels to determine an area in square cm. An embodiment may then determine the pigmentation 660, for example by computing a standard deviation of the points within the "dark" cluster to determine heterogeneity, and compute an average shade of the "light" and "dark" regions to determine darkness (pigmentation) using the difference of these averages. Reporting 670 of darkness, heterogeneity, area, and the like may then be provided to the user Referring to FIG. 7, an embodiment allows users to capture/upload an image of a cosmetic condition to evaluate the cosmetic condition. For example, an embodiment can utilize an image of the face to calculate a "plumpness index", which quantifies the degree of plumpness of the lips. For example, this may be repeated before and after a treatment to measure the effect thereof. The plumpness of a person's lips from a digital image may also be simulated, to simulate the effect of a treatment, for example, a collagen injection treatment.

An embodiment allows a user, after capturing/uploading an image of his or her face, 710, to highlight an area of interest (the lips in this example) using an input device 720. An embodiment provides a box for highlighting purposes, which the user can adjust to the height and width of the lips. The ratio of the height to the width of the box is then calculated 730. Because products for plumping the lips often affect only the height and not the width, the ratio of height to width allows for normalization across images of the same person. The ratio of height to width may be normalized (for example, multiplied by 100 and rounded to the nearest integer) to provide a plumpness score 740. The plumpness score may be modified prior to reporting 750, such as multiplication of the score by 100 and rounding to the nearest integer.

An embodiment may be provided as an interactive web application or mobile device application. For example, the user may upload an image that includes the lips, position a box (or appropriate shape) around the lips, signal (for example, by clicking a "compute" button in a web browser) that the positioning is finished. An embodiment then performs a calculation, such as described herein, to give a score. That score may then be presented to the user (for example, via a web browser). Thus, an embodiment allows at home or mobile device implemented scoring for various procedures that change the size or shape of a feature, such as lip plumpness, as through a simple browser or mobile device application.

Figure 8:
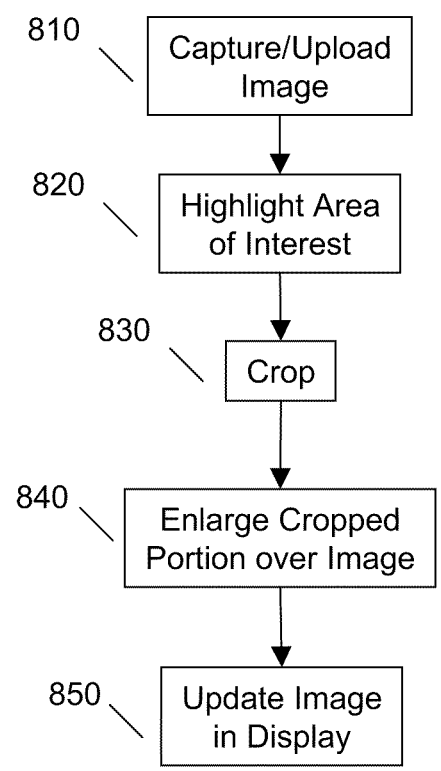
FIG. 8 illustrates an example method for simulating changes in a dermatological condition.

Referring to FIG. 8, an embodiment provides for simulating changes to a feature or cosmetic condition, using a current image of the feature or cosmetic condition, such as for visualizing the effect of a lip plumping procedure (for example, a collagen injection). As an example, patients undergoing procedures for plumping their lips would benefit from being able to visualize what their appearance will be following a treatment, prior to undergoing the treatment. An embodiment thus provides a visual simulation of the lip plumping treatment will have on a patient prior to administering the procedure by using a current image of the cosmetic condition (face including lips in this example)

The user captures/uploads a digital image of his or her face, 810, including the lips in a closed position. An embodiment prompts the user to draw a box around the lips 820 to highlight the area of interest. The coordinates of that box are used to crop a photo of the lips 830. The cropped photo is stretched vertically as the user adjusts a slider 840. The stretched, cropped photo is superimposed on top of the original, giving the appearance of enlarged lips, which is displayed to the user 850.

An embodiment thus obtains a cropped image (for example, of the lips), for example by the user drawing a box (or like shape) around the area of concern in the image (for example, around the lips in an image of the full face). The box is used to crop a photo of just the lips from the full-face image. The cropped lip image is then stretched in the vertical direction and superimposed on top of the original full-face image. The amount of stretching is specified by the user, for example, via a slider. Thus, an embodiment allows a user to visualize the effect of a cosmetic procedure, such as a collagen injection for lip plumping. As has been noted herein, an embodiment may be provided as a web-based product or a downloadable application (such as for a mobile device), without requiring special purpose hardware.

Figure 9:
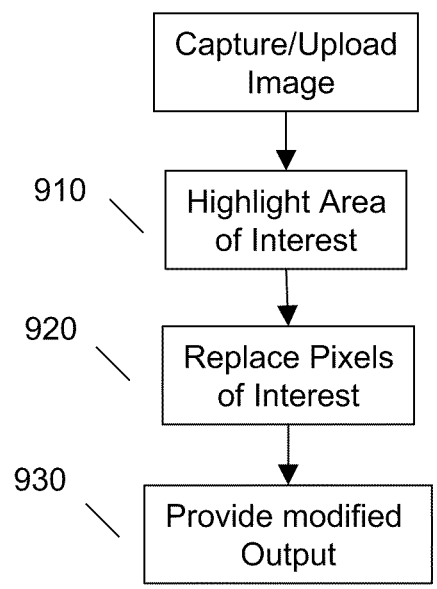
FIG. 9 illustrates an example method for simulating changes in a dermatological condition.

Additionally, referring to FIG. 9, an embodiment may also be utilized to provide a visualization tool for visualizing potential changes to a dermatological condition. For example, a visualization tool may operate by replacing pixels in a captured image representing a dermatological condition, for example acne, psoriasis melasma, and the like, with pixels representing unaffected regions of the skin. Thus, an embodiment provides a way for the user to see what he or she would look like without the dermatological condition. For example, an embodiment may work left to right on rows of pixels, starting at the top of a highlighted (or painted) region of interest 910 representing the affected area of the skin. The pixels within this highlighted region may then be replaced by an interpolation of "normal" skin pixels 920, for example the pixel just to the left of the highlighted region pixel and the pixel just to the right of the highlighted region pixel, across the row of pixels in the image. The row of pixels may then be smoothed, for example using the row of pixels above and/or below, to avoid vertical stripes in the resulting, modified image. Thus, such a modified image may be reported as output 930 and used as a visualization tool for predicting what the skin may look like absent the dermatological condition.

Figure 10:
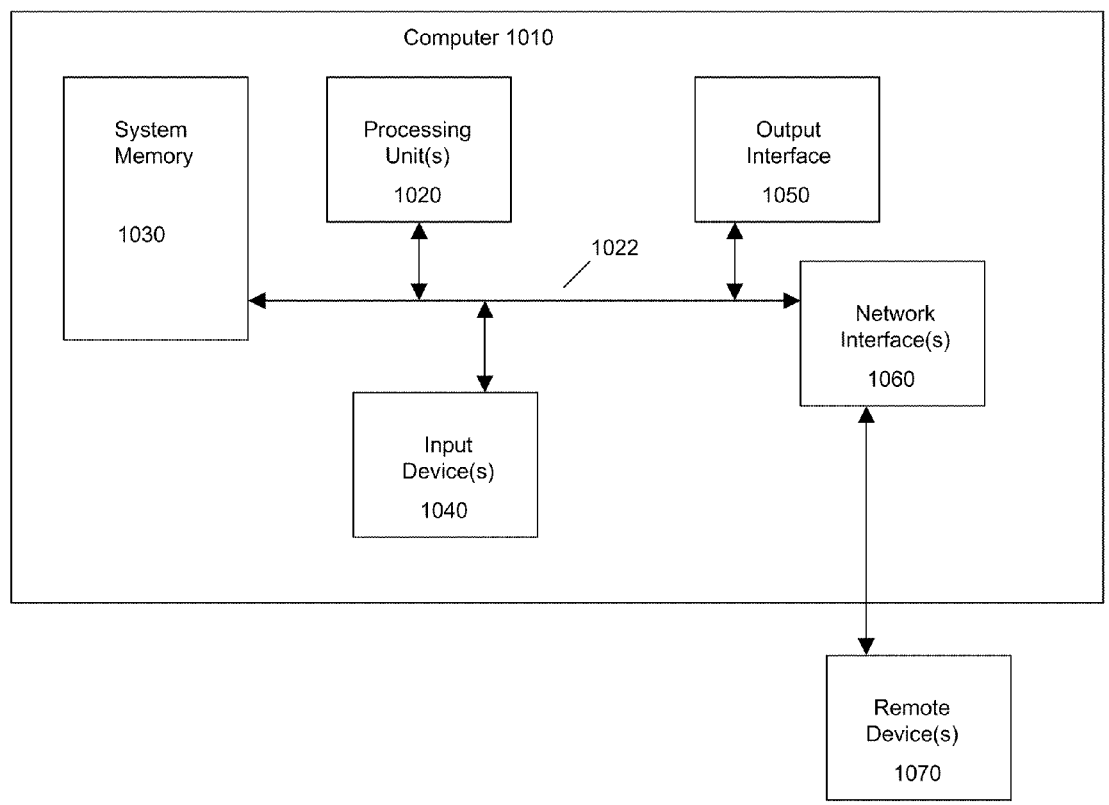
FIG. 10 illustrates an example computing device.

Referring to FIG. 10, it will be readily understood that certain embodiments can be implemented using any of a wide variety of devices or combinations of devices. An example device that may be used in implementing embodiments includes a computing device in the form of a computer 1010, though other devices such as tablet devices, smart phones and the like are equally applicable. In this regard, the computer 910 may execute program instructions configured to provide image calibration and analysis, and perform other functionality of the embodiments, as described herein.

Components of computer 1010 may include, but are not limited to, at least one processing unit 1020, a system memory 1030, and a system bus 1022 that couples various system components including the system memory 1030 to the processing unit(s) 1020. The computer 1010 may include or have access to a variety of computer readable media. The system memory 1030 may include computer readable storage media in the form of volatile and/or nonvolatile memory such as read only memory (ROM) and/or random access memory (RAM). By way of example, and not limitation, system memory 1030 may also include an operating system, application programs, other program modules, and program data.

A user can interface with (for example, enter commands and information) the computer 1010 through input devices 1040. A monitor or other type of device can also be connected to the system bus 1022 via an interface, such as an output interface 1050. In addition to a monitor, computers may also include other peripheral output devices. The computer 1010 may operate in a networked or distributed environment using logical connections (network interface 1060) to other remote computers or databases (remote device(s) 1070). The logical connections may include a network, such local area network (LAN) or a wide area network (WAN), but may also include other networks/buses.

It should be noted as well that certain embodiments may be implemented as a system, method or computer program product. Accordingly, aspects may take the form of an entirely hardware embodiment, an entirely software embodiment (including firmware, resident software, micro-code, et cetera) or an embodiment combining software and hardware aspects that may all generally be referred to herein as a "circuit," "module" or "system." Furthermore, aspects may take the form of a computer program product embodied in computer readable medium(s) having computer readable program code embodied therewith.

Any combination of computer readable medium(s) may be utilized. The computer readable medium may be a non-signal computer readable medium, referred to herein as a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Program code embodied on a computer readable medium may be transmitted using any appropriate medium, including but not limited to wireless, wireline, optical fiber cable, RF, et cetera, or any suitable combination of the foregoing.

Computer program code for carrying out operations for various aspects may be written in any programming language or combinations thereof. The program code may execute entirely on a single computer (device), partly on a single computer, as a stand-alone software package, partly on single computer and partly on a remote computer or entirely on a remote computer or server. In some scenarios, the remote computer may be connected to another computer through any type of network, including a local area network (LAN) or a wide area network (WAN), or the connection may be made for example through the Internet using an Internet Service Provider.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer, or other programmable apparatus, provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Although illustrated example embodiments have been described herein with reference to the accompanying drawings, it is to be understood that embodiments are not limited to those precise example embodiments, and that various other changes and modifications may be affected therein by one skilled in the art without departing from the scope or spirit of the disclosure.

What is claimed is:

1. A method comprising:
   receiving an image including a representation of a dermatological condition at a computing device;
   quantitatively analyzing, using a processor, the representation of said dermatological condition of said image;
   said quantitatively analyzing comprising:
      determining a dimension of said dermatological condition; and
      aggregating values associated with the dimension in an area of interest within said image corresponding to said dermatological condition; and
   providing one or more outputs responsive to said quantitatively analyzing said representation of said dermatological condition of said image;
   said one or outputs comprising a reported score;
   the reported score being a scaled integer representing an index value summarizing said dermatological condition;
   wherein said dimension includes color variation of skin; and
   wherein said quantitatively analyzing further comprises:
      converting the image to a representation of edges;
      summing the edges; and
      computing the scaled integer representing a dermatological condition index value.

2. The method of claim 1, wherein said quantitatively analyzing further comprises:
   applying a spatial band pass filter to the image; and
   accepting a user input marking a region of interest within the image;
   wherein said converting the image to a representation of edges comprises taking a spatial derivative to convert the image to the representation of edges; and
   using an RGB channel of the representation of edges to sum all edges within the region of interest.

3. The method of claim 1, wherein the dermatological condition comprises acne.

4. A method comprising:
   receiving an image including a representation of a dermatological condition at a computing device;
   quantitatively analyzing, using a processor, the representation of said dermatological condition of said image;
   said quantitatively analyzing comprising:
      determining a dimension of said dermatological condition; and
      aggregating values associated with the dimension in an area of interest within said image corresponding to said dermatological condition; and
   providing one or more outputs responsive to said quantitatively analyzing said representation of said dermatological condition of said image;
   said one or more outputs comprising a reported score;
   the reported score being a scaled integer representing an index value summarizing said dermatological condition;
   wherein said dimension includes color variation of skin; and
   wherein said quantitatively analyzing further comprises:
      computing de-pigmentation using said pixels of said image via calculating a number of de-pigmented pixels;
      calculating an area of de-pigmentation using the number of de-pigmented pixels; and
      computing the scaled integer representing a dermatological condition index value.

5. The method of claim 4, wherein the dermatological condition comprises vitiligo.

6. A method comprising:
   receiving an image including a representation of a dermatological condition at a computing device;
   quantitatively analyzing, using a processor, the representation of said dermatological condition of said image;
   said quantitatively analyzing comprising:
      determining a dimension of said dermatological condition; and
      aggregating values associated with the dimension in an area of interest within said image corresponding to said dermatological condition; and
   providing one or more outputs responsive to said quantitatively analog said representation of said dermatological condition of said image;
   said one or more outputs comprising a reported score;
   the reported score being a scaled integer representing an index value summarizing said dermatological condition;
   wherein said quantitatively analyzing further comprises:
      identifying pixels of said image representing a dermatological condition area and a non-dermatological condition area, and
      automatically modifying, using a processor, said pixels in said dermatological condition area to more closely represent pixels of said non-dermatological condition area;
   said providing one or more outputs comprising providing a modification of said image including said modified pixels.

7. The method according to claim 6, wherein:
   said dimension includes darkness variation of skin; and
   said quantitatively analyzing comprises:
   computing pigmentation using said pixels of said image; and
   computing the scaled integer.

8. The method of claim 7, wherein the dermatological condition comprises melasma.

9. The method according to claim 6, wherein:
said dimension includes redness; and
said quantitatively analyzing comprises computing the scaled integer representing a redness index value.

10. The method according to claim 6, wherein:
said dermatological condition includes an area; and
said quantitatively analyzing comprises computing the scaled integer representing the area.

11. The method according to claim 10, wherein:
said quantitatively analyzing comprises computing an enlarged sub-area for overlaying and altering said image responsive to user input.

12. The method of claim 10, wherein the dermatological condition comprises lip plumpness.

\* \* \* \* \*